Dec. 16, 1969   M. J. HANLAN   3,483,652
ANIMAL TRAPS
Filed Nov. 21, 1968

INVENTOR.
Mike J. Hanlan
BY James R. Eyster
Agent 3,483,652
ANIMAL TRAPS
Mike J. Hanlan, 850 N. Riverside Drive,
Tucson, Ariz. 85702
Filed Nov. 21, 1968, Ser. No. 777,755
Int. Cl. A01m 23/20
U.S. Cl. 43—61                                    1 Claim

ABSTRACT OF THE DISCLOSURE

A wire cage has a vertically-sliding door at one end and a bait hook pivoted at the other. The bait hook is connected to a pull rod for engagement with a detent hole near the lower edge of the door in the door-open position. In the door-closed position a flat spring on the door post engages a detent on the side of the door, locking it closed.

---

Figure 1:
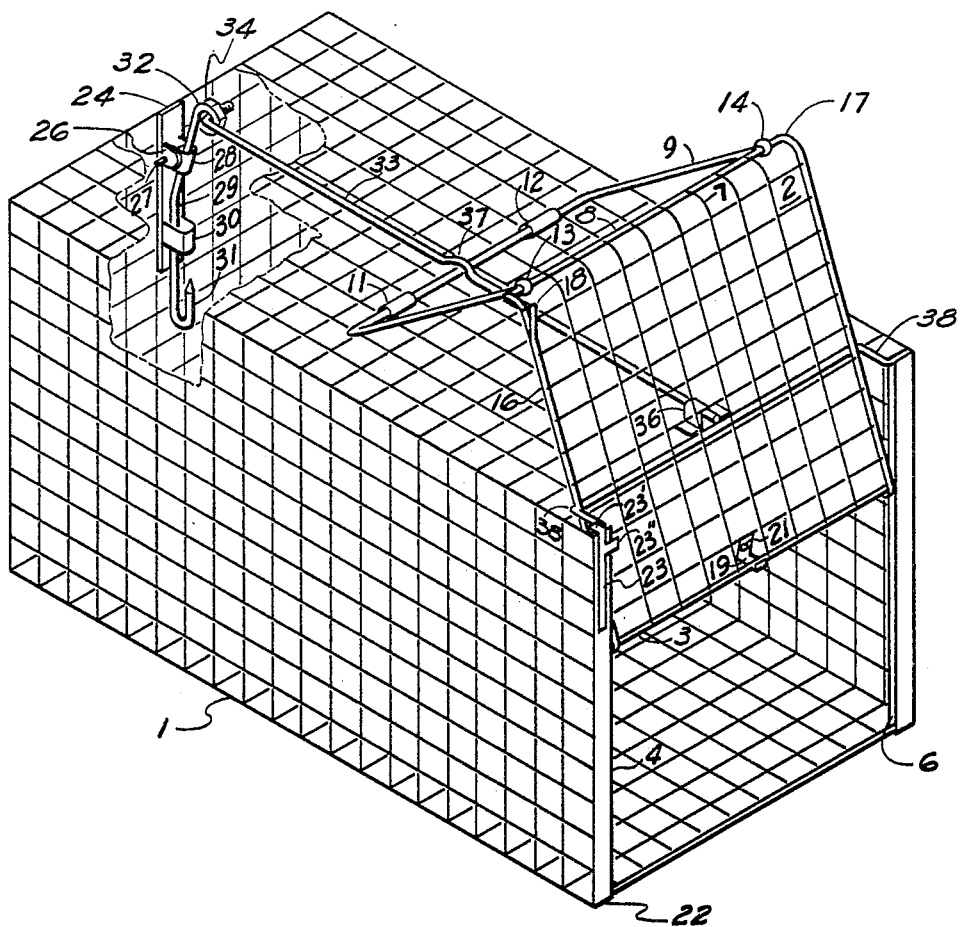

This invention relates to animal cage traps.

The cage type of animal trap consists of a cage with a door in one end and provision for placing bait inside the cage. In setting the trap the door is latched in the open position. When an animal enters and touches the bait, the door is unlatched and closes, trapping the animal, unhurt, inside the cage.

The present invention provides such a trap having simple, rugged and easily-made parts. Action is rapid. The door, when closed, is locked against opening by the animal.

The object of this invention is to provide an animal trap of novel and superior design.

A further understanding of the invention may be secured from the detailed description and the single drawing showing an isometric view of a preferred embodiment.

Referring now to the drawing, a cage 1 made of wire mesh is in the form of an elongated rectangular parallellepiped, with a drop door, 2, in one end. A rod 3 forms the bottom edge of door 2 and protrudes beyond the sides of the door into two slots, 4 and 6, in door posts forming the corners of the cage on either side. Near the top of the door its surface is curved, as indicated at 7. A rod 8 forms the top edge of the door. A wire bail, 9, is shackled to the top of the cage at 11 and 12, forming loose bearings. The ends of the bail 9 are bent, at 13 and 14, around the rod 8 to form two bearings. Two rods, 16 and 17, form the sides of the door. A detent, 18, is secured to the rod 16. A metal strip 19 provided with an aperture 21 is secured to the door near its bottom edge. The door post 22 carries, near its upper end, a resilient metal strap, 23, secured at its lower end to the post 22 and lying snugly against the post. The upper end 23' is bent to form a convenient finger grip. A projection, 23", is so positioned as, in the closed door position, to engage the detent 18.

A hinge plate, 24, is secured to the end of the cage opposite to the door 2. The drilled ears, one being visible at 26, project from plate 24 to serve as bearings for a pin 27. A U-member, 28, is soldered or welded to a rod 29. The pin 27 passes through the ears and the U-member 28 and supports it and rod 29. Another U-member, 30, is secured to the hinge plate 24, surrounds rod 29 and limits its transverse motion. The rod 29 is bent near its middle in such a way that, when at rest, the lower end hangs in contact with the hinge plate 24. The lower end of rod 29 is sharpened and bent to form a hook, 31, for bait, and the top end is bent into an eye 32.

A pull rod 33 is bent at one end through the eye 32 and secured by a nut 34. The other end of rod 33 is straight and of such length that, when the door is fully up, the rod slides into aperture 21 and supports the door in its raised position. A shackle 36 controls side movement of rod 33. The rod 33 is bent at 37 to avoid contact with bail 9.

The roof of the cage is cut back or relieved at 38 to prevent interference with the raised door 2.

In operation of the trap, the door 2 is raised until latched open by engagement of rod 33 in aperture 21. A piece of meat or other animal bait is put on hook 31. This further weights rod 29, making engagement of rod 33 in aperture 21 still more secure.

When an animal pulls at the bait, the hook 31 moves toward the animal. The rod 29, moving around bearing pin 27 pulls the rod 33 out of aperture 21. The door then drops of its own weight to its fully closed position, when the detent 18, passing the projection 23", flexes the strap 23 outward, permitting the detent to pass. The strap 23 then snaps back and the projection 23" locks the door in its closed position.

To raise the door, the strap 23 is grasped at 23' and pulled outward, when the door can be raised, the detent 18 passing under the projection 23".

What is claimed is:
1. In a cage animal trap having two vertical corner posts at one end and having a door between said posts,
    a vertical slot in each said door post;
    a projection in each lower corner of said door slidably engaging one of each said slots;
    a horizontal flat roof covering said trap, said roof being cut away near said door, whereby interference with door motion is prevented;
    a curved upper portion of said door matching said cutaway roof, whereby in closed position the door top edge meets and closes the cut-away roof;
    a pair of shackles borne by said roof;
    a bail journalled in said shackles and secured to the top edge of said door;
    a detent secured to one side edge of said door;
    a strap provided with an aperture and secured to the inside surface of said door near its bottom edge;
    a resilient strap secured at its lower end to one said door post on the same side as said detent, said strap bearing a side projection engaging said detent;
    a bait rod bent near its center, having its lower end bent into a bait hook and having its upper end bent into an eye;
    an arm secured to said bait rod above its bend and extending toward the trap wall opposite the door;
    a bracket secured to the trap wall opposite the door and hinged to said arm, whereby the center of gravity of the bait rod lies inward of the point of hinged support; and
    a pull rod connected at one end to said eye and extending above and lying on and along said roof, having the other end adjacent to said door and vertically aligned with the aperture in said strap secured to the door.

References Cited

UNITED STATES PATENTS 1,466,602  8/1923  Savicks _____ 43—61
1,474,096  11/1923 Sorenson _____ 43—61

WARNER H. CAMP, Primary Examiner